April 5, 1932.  A. O. FABRIN  1,852,204

DEVICE FOR VARYING THE PITCH OF PROPELLERS

Filed Jan. 21, 1930   2 Sheets-Sheet 1

Inventor
Axel O. Fabrin
By Clarence A. O'Brien
Attorney

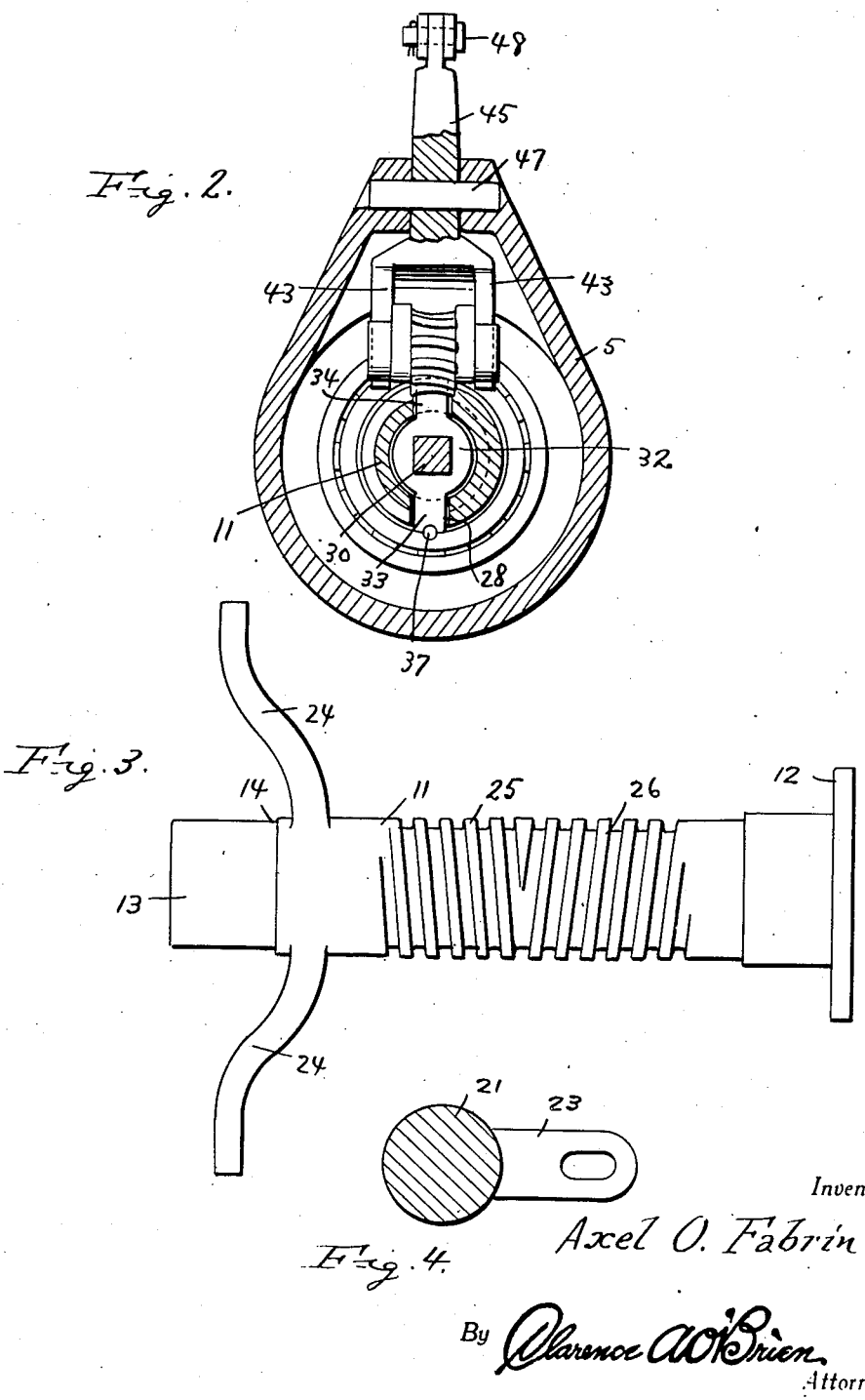

Patented Apr. 5, 1932

1,852,204

UNITED STATES PATENT OFFICE

AXEL OSCAR FABRIN, OF MEMPHIS, TENNESSEE

DEVICE FOR VARYING THE PITCH OF PROPELLERS

Application filed January 21, 1930. Serial No. 422,343.

This invention relates broadly to variable pitch propellers, and has more particular reference to certain new and novel improvements in devices for varying the pitch of the propeller.

A primary object of this invention is to provide a device for transmitting power or motion from a prime mover to a propeller and embodying a bar, shaft, or tube or combination thereof, whereby said bar, shaft, tube or combination thereof is capable of being deformed elastically, being of steel, or other alloy, not necessarily steel as for example bronze, (it being only essential that the element referred to be made of metal) and wherein the resultant angular deformation or twist of said bar, shaft or tube or combination thereof for transmitting power or motion may be utilized to change the pitch of the blade or blades of a propeller.

A still further object of the invention is to provide a device of this character which is simple in construction, thoroughly reliable, practical and efficient in use and operation, and otherwise well adapted for the purpose designed.

Other objects and advantages of the invention will become apparent during a study of the following description, taken in connection with the accompanying drawings, wherein:

Figure 2 is a vertical sectional view taken substantially on line 2—2 of Figure 1.

Figure 3 is a plan view of the propeller carrying shaft.

Figure 4 is a detail sectional view taken substantially on line 4—4 of Figure 1.

Figures 1, 5:
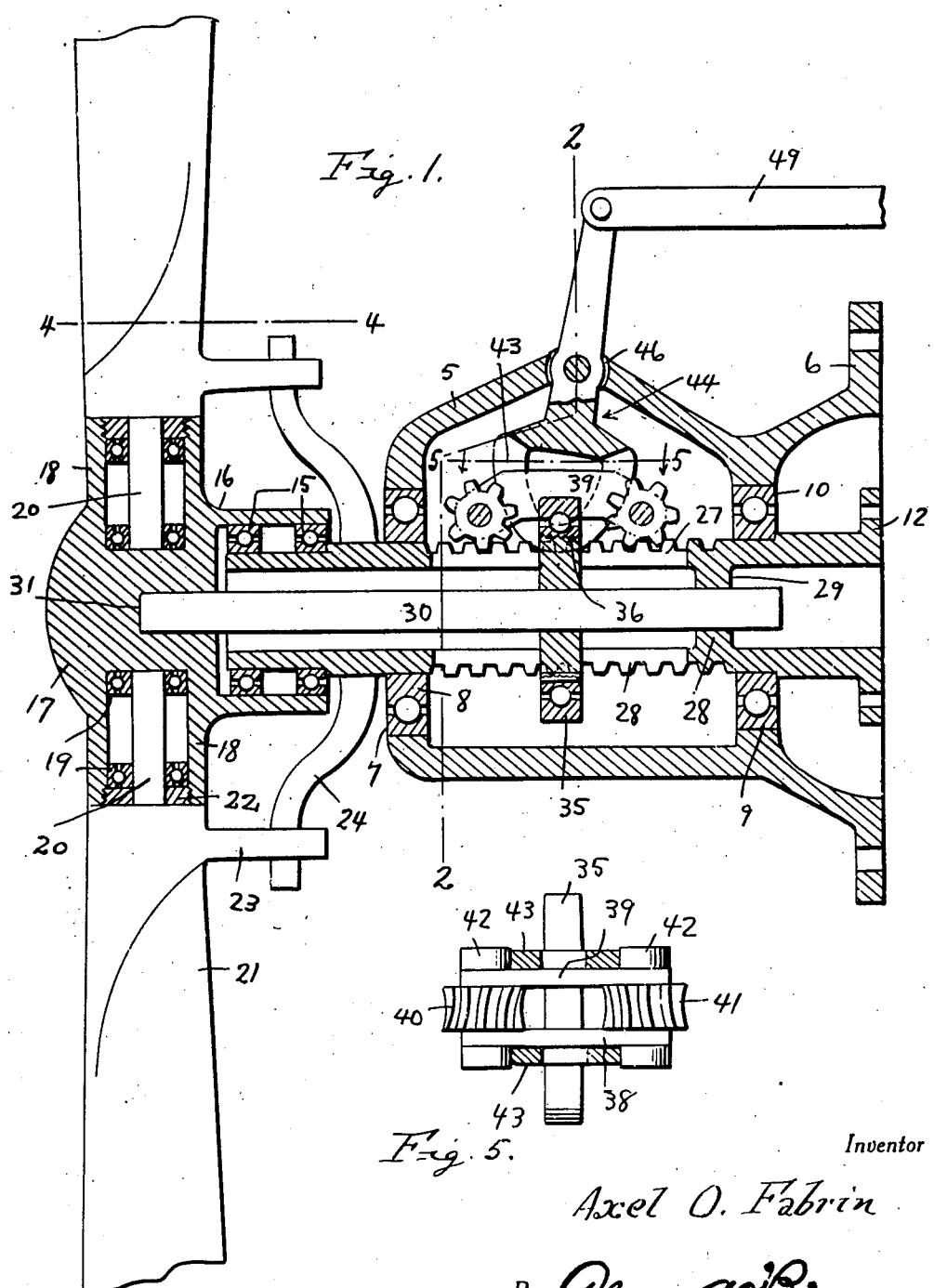
Figure 1 is a detail view partly in section and partly in elevation of the device for transmitting power and varying the pitch of a propeller.
Figure 5 is a detail view taken substantially on the line 5—5 of Figure 1.

With reference more in detail to the drawings, it will be seen that my invention comprehends the provision of a suitable housing or casing 5 provided at the rear thereof with an apertured attaching flange 6 whereby the housing may be bolted or otherwise secured in position on the aeroplane in operative relation to the motor or prime mover, such as an internal combustion engine which is used for driving the propeller.

The housing 5 is provided with an opening 7 in the front wall thereof within which opening is disposed a suitable annular bearing 8. Inwardly from its rear end, the said housing is provided with an internal annular flange 9, within the confines of which flange 9 is mounted a suitable bearing 10 corresponding to the bearing 8. The bearings 8 and 10 are in longitudinal alinement, and rotatably mounted in the bearings is a hollow propeller supported driven shaft 11.

The shaft 11 at its rear end is provided with an annular apertured collar or flange 12 whereby the shaft 11 may be coupled to the drive shaft of the prime mover (not shown).

The shaft 11 is open at its opposite ends, and the forward end of the shaft projects a suitable distance beyond the adjacent end of the housing 5 as clearly shown to advantage in Figure 1. At said forward end, the shaft 11 is reduced as at 13 to provide an annular shoulder 14 inwardly from the forward end of said shaft.

Mounted on the reduced end 13 are a pair of spaced apart annular bearings 15—15, which bearings 15—15 are confined within the tubular extension 16 of a propeller hub 17, said hub 17 being rotatable relative to the shaft 11 as is apparent. The hub 17 has extending from diametrically opposite sides thereof radial tubular extensions 18. Arranged in each of the tubular arms or extensions 18 are suitable annular bearings 19, the inner races of which bearings 19 are mounted on relatively short stub shafts or pins 20 extending into said tubular arms 18, which pins 20 are carried on the inner ends of propeller blades 21, as shown to advantage in Figure 1.

To retain the propeller blades 21 secured to its hub 17 there is provided annular retaining members 22 threaded in the outer ends of said tubular arms 18 as also shown to advantage in Figure 1. Thus, in this manner are the propeller blades 21 rotatably fixed to the hub 17.

Each of the propeller blades 21 at their inner ends are provided with laterally extending slotted lugs 23 within the slots of which are movable the free ends of angular arms 24, projecting from diametrically opposite sides of the shaft 11 between the shoulder 14 and the forward end of the housing 5, as is also shown to advantage in Figure 1.

Intermediate its ends the driven shaft 11 is provided with right and left hand coarse threads 25 and 26 respectively. The threaded portion of the shaft 11 at the top and bottom thereof is longitudinally slotted as at 27 and 28 respectively. Inwardly from its rear end, the shaft 11 is provided with a partition 28 having a centrally arranged squared opening 29 for accommodating the inner or rear end of a flexible shaft 30, which shaft 30 is square in cross section, and has said inner end fitting conformably within the opening 29. The torque bar 30 being made of metal as for example, steel or any alloy, not necessarily steel as for example bronze.

The flexible shaft 30 extends forwardly and axially of the shaft 11 and at its front or forward end projects beyond the adjacent end of said shaft 11, the forward end of said flexible shaft 30 fitting conformably within a socket 31 axially of the hub 17. Thus it will be seen that the flexible shaft 30 forms a key member between the hub 17 and driven shaft 11.

Thus it will be seen that during the rotation of the shaft 11, the propeller embodying the hub 17 and blades 21 will rotate therewith. Slidable on the cross bar or shaft 30 within the shaft 11 is a member 32 having a non-circular or squared opening for accommodating the torque bar 30 as shown to advantage in Figure 2. At its lower end the movable member 32 is provided with a depending lug or extension 33 operable in the lower slot 28, while at its upper end the said member 32 is provided with an upstanding lug or extension 34 movable longitudinally of the upper slot 27.

Circumjacent the threaded intermediate portion of the shaft 11 is an annulus ball bearing 35, the inner race of which is screw threadedly engaged with the upper end of the lug 34 as at 36, the said inner race of the bearing 35 being at its lower portion keyed to the lug 33 in any suitable manner such as designated at 37 (see Figure 2).

Formed integrally therewith and extending transversely of the outer race of the ball bearing 35 at the top thereof is a pair of spaced parallel bars 38 and 39, each of which bars at their ends are angularly disposed downwardly and outwardly towards the shaft 11 as clearly suggested in Figure 1.

Mounted between said ends of the bars 38 and 39, are the pinions 40 and 41, the pinion 40 being adapted to mesh with the threads 25, and the pinion 41 being adapted to mesh with the threads 26 of the shaft 11. The pinions 40 and 41 are of course mounted on suitable shafts, the ends of which extend beyond or laterally of the members 38 and 39 and on said ends have enlarged collars 42 forming braking surfaces or shoes for the pinions as will become more obvious hereinafter.

Cooperating with the brake shoes 42 are frame members 43—43, which frame members 43—43 constitute the legs of a fork member designated generally by the reference character 44. The frame members 43 are disposed on opposite sides of the bars 38 and 39 between pairs of the brake shoes 42 to alternately engage with the brake shoes of the respective pinions for applying alternately a braking action to the pinions, as clearly suggested in Figure 1.

The shank 45 of the fork 44 has its lower end portion extending through an opening 46 in the top of the housing 5 and said shank at said lower end within said opening 46 is rockable on a pivot pin 47 extending transversely through the shank and having its opposite ends mounted in the top of the housing 5 at opposite sides of the opening 46 as shown to advantage in Figure 2.

The upper free end of the shank 45 is pivoted as at 48 within the furcation formed in one end of an actuating rod 49 shown fragmentarily in Figure 1.

In operation, it will be seen that shaft 11 will be driven from the prime mover (not shown) for rotating the propeller. Hub 17 being capable of rotation relative to shaft 11, will cause torque bar 30 to twist axially, and this angular twist of the torque bar 30 relative to the hub 17 is conveyed through the lugs 23 to the arms 24 which in turn causes a variation in the angle of the propeller blade 21, the blades 21 being rotatably mounted on the hub 17 as hereinbefore described in detail.

The deformation of torque bar 30 may be regulated in the following manner: By swinging the fork 45 in the direction suggested in Figure 1, parts 43 of the fork will engage with the shoes 42 on the ends of that shaft upon which is splined the pinion 41, and pinion 41 will thus be held from rotation and the threads 26 will drive this pinion 41 and its unitary part 32 forwardly or backwardly depending upon the direction of rotation of shaft 11 with threads 26, the pinion 40 being free to rotate and follow in its cooperating threads 25. The longitudinal movement of member 32 relative to torque bar 30 is reversed upon the braking action being applied to shoes 42 of pinion 40 thus the effective length of torque bar 30 is manually controlled by the pilot of the aeroplane which in turn controls the variation of pitch of the propeller blades.

From the foregoing, then, it will be seen that through the medium of this invention, manual control of the pitch of the propeller blades when starting or stopping or during flight of an aeroplane or other vehicle so equipped, and whereby such control is effected in an expeditious manner.

It is thought that from the foregoing description, taken in connection with the accompanying drawings, a clear understanding of the operation, construction, utility and advantages of a device of this character will be had by those skilled in the art without a more detailed description.

Even though I have herein shown and described the preferred embodiment of my invention, it is to be understood that the same is susceptible to various changes fully comprehended by the spirit of the invention as herein described, and the scope of the appended claims.

Having thus described my invention, what I wish to claim as new is:

1. In a device for varying the pitch of a variable propeller, a driven shaft, a variable pitch propeller mounted on said driven shaft, an operating connection between said shaft and the blades of said propeller, a flexible member operatively connected with said shaft and the hub of said propeller axially of said shaft and said hub, whereby during rotation of said shaft and said propeller, said flexible member will be axially twisted, and means for controlling the angular twist of said flexible connecting member.

2. In a device for varying the pitch of a variable propeller, a driven shaft, a variable pitch propeller mounted on said driven shaft, a loose connection between said shaft and the blades of said propeller, a flexible member operatively connected with said shaft and the hub of said propeller axially of said shaft and said hub, whereby during rotation of said shaft and said propeller, said flexible member will be axially twisted, and means for controlling the angular twist of said flexible connecting member, said last mentioned means including means movable longitudinally of said flexible member for varying the effective length of said flexible member.

3. In a device for varying the pitch of a variable propeller, a driven shaft, a variable pitch propeller mounted on said driven shaft for rotation relative thereto, an operating connection between said shaft and the blades of said propeller, a flexible member operatively connected with said shaft and the hub of said propeller axially of said shaft and said hub, whereby during rotation of said shaft and said propeller, said flexible member will be axially twisted, and means for controlling the angular twist of said flexible connecting member, said last mentioned means including means movable longitudinally of said flexible member and having a driving connection with said driven shaft, and manually controlled means for controlling the direction of movement of said movable member.

4. In a device of the character described, a driven shaft, a hub rotatably mounted on said driven shaft, propeller blades radiating from said hub, means for rotatably mounting said propeller blades on said hub, angular arms extending radially from said shaft, laterally extending members projecting from said propeller blades, and having slots therein for receiving the free ends of said angular arms, an elongated torque bar extending axially of said shaft and said hub, means for keying the ends of said torque bar to said hub and shaft, and manually controlled means for varying the effective length of said torque bar for controlling the pitch of said propeller blades.

5. In a device of the character described, a driven shaft, a hub rotatably mounted on said driven shaft, propeller blades radiating from said hub, means for rotatably mounting said propeller blades on said hub, angular arms extending radially from said shaft, laterally extending members projecting from said propeller blades, and having slots therein for receiving the free ends of said angular arms, an elongated torque bar extending axially of said shaft and said hub, means for keying the ends of said torque bar to said hub and shaft, said flexible member being capable of axial twist during rotation of said shaft, and manually controlled means having a driven connection with said driven shaft for varying the effective length of said torque bar for controlling the amount of angular twist imparted to said torque bar during rotation of said shaft.

6. In combination, a driven member, a variable pitch propeller mounted on said driven member for rotation relative thereto, an operating connection between said driven member and the rotatable blades of the propeller, a torque bar operatively connected with said driven member and the hub of said propeller, and manual means for controlling the axial twist of said torque bar.

7. A device for varying the pitch of a variable propeller comprising in combination a flexible power transmitting member capable when rotated or stressed of being angularly twisted, means for transmitting and utilizing the angular twist of said member for effecting a change in the pitch of a propeller blade or blades, and means for controlling the angular twist of said flexible power transmitting member.

In testimony whereof I affix my signature.

AXEL OSCAR FABRIN.